A. HARVEY.
Accessible Joint, Valve, and Trap-Protectors for Underground Pipe.
No. 213,653.   Patented Mar. 25, 1879.
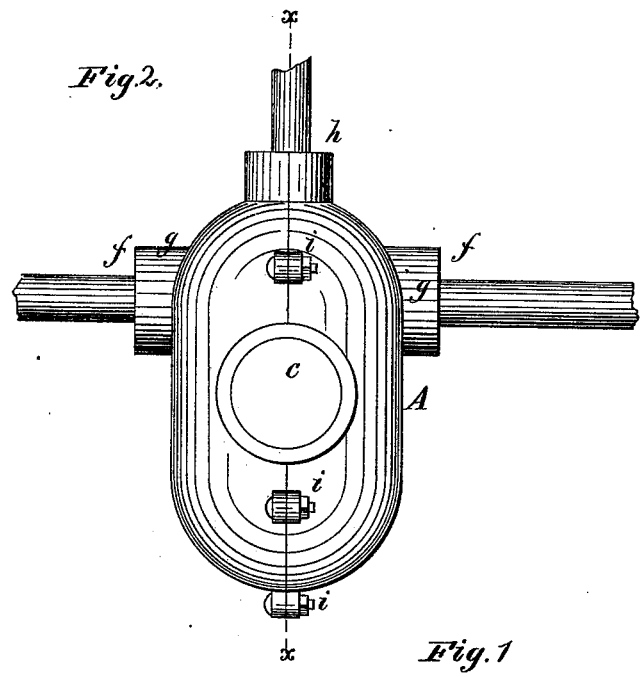
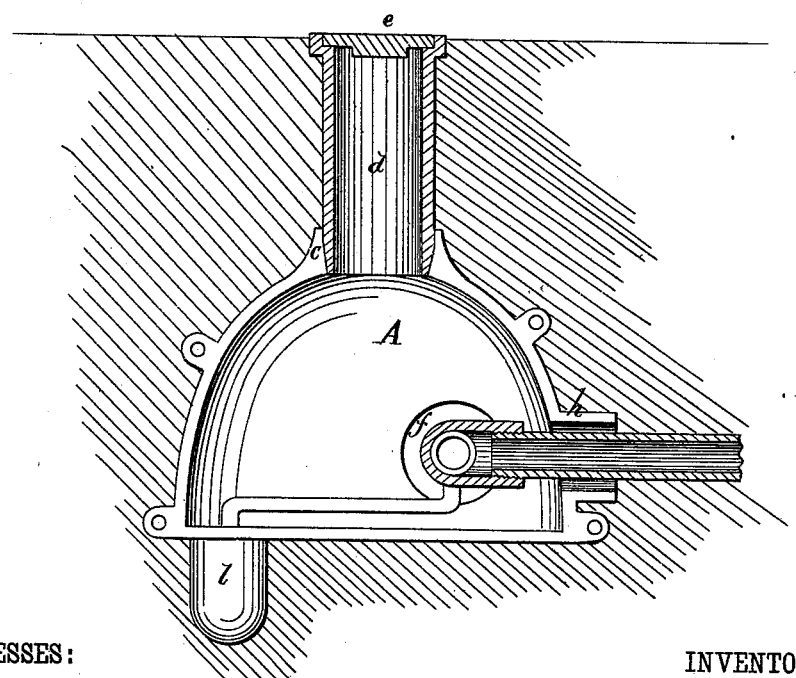
WITNESSES:
Henry N. Miller
C. Sedgwick
INVENTOR:
A. Harvey
BY Munn & Co
ATTORNEYS.

UNITED STATES PATENT OFFICE.

ANDREW HARVEY, OF DETROIT, MICHIGAN.

IMPROVEMENT IN ACCESSIBLE JOINT, VALVE, AND TRAP PROTECTORS FOR UNDERGROUND PIPES.

Specification forming part of Letters Patent No. 213,653, dated March 25, 1879; application filed October 19, 1878.

*To all whom it may concern:*

Be it known that I, ANDREW HARVEY, of Detroit, in the county of Wayne and State of Michigan, have invented a new and Improved Accessible Joint, Valve, and Trap Protector for Underground Pipes, of which the following is a specification:

My invention has for its object to render accessible the joints and valves of underground water, gas, or steam pipes without tearing up the street.

It is necessary that access be had to such pipes at times for the purpose of packing joints, mending breaks, and making connections; and heretofore work of that kind has been expensive, especially when pipes burst by freezing and the frozen ground has to be broken open. Besides this there is trouble and annoyance to travel caused by digging up the street.

My invention consists in accessible joint, valve, and trap protectors, made of wood or metal, large enough to admit a person within them, and accessible by a man-hole from the surface of the ground.

The protector is made with openings at each side for passage of the water, gas, or steam pipe, and also with an opening for a branch pipe; and when used with steam-pipes the protector will be used in connection with a steam-trap to carry off the water of condensation.

In the accompanying drawings, Figure 1 is a vertical longitudinal section of my device applied in connection with steam-pipes. Fig. 2 is a plan of the same.

Similar letters of reference indicate corresponding parts.

A is the protector, which is preferably made of metal in two pieces, bolted together, as at $i$, and the joint made water-tight. The bolts pass through lugs, as shown; but the two parts of A may be cast with flanges instead of lugs.

The two parts, when secured together, form a box or chamber having a flat bottom and arched top large enough to admit a workman and leave room for working upon the pipe that passes through the chamber.

At the top is a flanged opening, $c$, adapted to receive the lower end of the man-hole tube $d$, which extends to the top of the ground, and is provided with a cover, $e$.

At each side of the protector A is a circular opening, $f$, which may or may not have a flange, $g$, and at one end is an opening, $h$.

The openings $f$ permit the passage of the steam, water, or gas pipe through the chamber, and the opening $h$ is for a branch or service pipe. When used in connection with pipes that have an outer covering-pipe, the said outer pipe will be connected to the flanges $g$.

$l$ is a steam or waste trap of any desired construction, connected with the protector $h$ for the purpose of carrying off the water of condensation from steam-pipes, and it may be used for carrying off water which collects in the protector from leaks or otherwise. This trap $l$ is to be connected with a sewer by a pipe in any desired manner.

The accessible joint, valve, and trap protector described is to be placed in suitable positions along the line of underground pipes, at the main joints and at low points in the line, and the man-hole tube connected with it for the purpose of giving access from the surface of the street. By its use free access is obtained at any time to the joints and pipes for repairs or other purposes without tearing up the street.

The protector may be made of wood or of metal cast in one piece, and may also be made without a bottom if it is used for any purpose where it is not necessary to be water-tight.

Having thus described my invention, I claim as new and desire to secure by Letters Patent—

1. The accessible joint, valve, and trap protector A, constructed with a flanged opening, $c$, adapted to receive a man-hole tube, and with openings $f$ for the passage of the steam, water, or gas pipes, substantially as described, and for the purposes set forth.

2. The accessible joint, valve, and trap protector A, constructed with a flanged opening, $c$, adapted to receive a man-hole tube, and with openings $f$ for the passage of the steam, water, or gas pipes, the openings $f$ having a surrounding flange, $g$, as set forth, and for the purposes described.

ANDREW HARVEY.

Witnesses:
E. G. DUDLEY,
THOMAS DAVIES.